United States Patent [19]

Makino

[11] Patent Number: 4,786,354
[45] Date of Patent: Nov. 22, 1988

[54] APPARATUS FOR MANUFACTURING A SEAT

[75] Inventor: Hiroyuki Makino, Akishima, Japan

[73] Assignee: Tachi-S Co., Ltd., Akishima, Japan

[21] Appl. No.: 30,116

[22] Filed: Mar. 26, 1987

[51] Int. Cl.$^4$ .............................................. B65H 1/00
[52] U.S. Cl. ................................... 156/538; 156/556; 156/567; 269/8; 414/122
[58] Field of Search ............... 156/538, 556, 557, 567, 156/245, 219, 220, 563, 272.4; 269/8; 221/212; 414/122, 744 C; 29/38 B, 91; 425/3, DIG. 33

[56] References Cited

U.S. PATENT DOCUMENTS

| 3,095,344 | 6/1963 | Sandow | 156/557 |
| 4,600,349 | 7/1986 | Vogt | 414/225 |

Primary Examiner—David Simmons
Attorney, Agent, or Firm—Oldham & Oldham Co.

[57] ABSTRACT

An apparatus for manufacturing an automotive seat comprises a pair of upper and lower dies, the former die being adapted to mount thereupon a foam cushion member having a metallic frame embedded therein, and the latter die being adapted to mount an inside-out turned top cover member thereon. In the upper die, arranged are plural electromagnets. Under the influence of magnetic force given by the electromagnets, the cushion member with the metallic frame is attracted to and retained by the upper die, and while in such state, lowering and pressing the upper die against the top cover member causes bonding together the cushion and top cover members.

4 Claims, 2 Drawing Sheets

APPARATUS FOR MANUFACTURING A SEAT

BACKGROUND OF THE INVENTION

1. Field of the Invention

The present invention relates to an apparatus for manufacturing an automotive seat, and in particular to an apparatus for manufacturing an automotive seat by pressing and bonding a foam cushion member with an adhesive to a top cover member, using a pair of upper and lower dies so as to assemble a seat.

2. Description of the Prior Art

Generally, a seat manufacturing apparatus of this kind is of such structure that there are a pair of upper and lower dies, both of them being aligned in the same vertical direction in an opposing relation with each other, with the upper one being adapted to allow securing a foam cushion member (made of urethane foam material) thereon and the lower one being adapted to allow placing a top cover member thereon, and that, in operation, the upper die is lowered towards the lower die so that the cushion member on the former die is pressed and bonded to the top cover member on the latter one where it is applied an adhesive.

In such apparatus, clamps are provided on the upper die for securing purpose in order that the lateral walls of the cushion member is retained between the clamps and by being so retained the cushion member is kept secured on the upper die. However, the apparatus with such clamps employed involves various disadvantages, and for example, the following problems are found.

1. When it is desired to mechanically cause the clamps to hold the walls of the cushion member therebetween, there is need to equip a mechanism for opening and closing the clamps relative to the cushion member, resulting in a greater complication of mechanical structure of the apparatus.

2. The pressure given by the clamps to the lateral walls of cushion member creates a deformation in the surfaces of the walls, which prevents a close contact between the cushion member and top cover member.

3. In the case where a small number of clamps are provided on the upper die, the cushion member is not secured positively to the die and dangles therefrom, with the result that the cushion member is displaced from its correct position relative to the top cover member.

To eliminate the abovementioned disadvantages, there has been proposed a vacuum suction mechanism in which air is sucked from a hole perforated in the upper die to form vacuum between the cushion member and the upper die, whereby the cushion member is drawn and secured to the upper die. However, it can only be utilized effectively for a relatively light cushion member, and in case of a relatively heavy cushion member formed integrally with metallic frames, it has been found insufficient in drawing force for securing the cushion member to the die.

SUMMARY OF THE INVENTION

It is a primary purpose of the present invention to provide an apparatus for manufacturing a seat which is simple in structure, easy in operation for securing a cushion member to an upper die, and permits correctly securing the cushion member to a predetermined position in the upper die.

In accordance with the present invention, a novel apparatus is provided, considering the fact that a metallic frame is embedded in such a cushion member as used in a seat back of automotive seat or the like. Therefore, in the apparatus of the invention, an upper die on which such cushion member is secured has an electromagnet arranged therein, so that the metallic frame in the cushion member is drawn to the upper die under the influence of a magnetic force of the electromagnet, thereby securing the cushion member to the upper die and allowing a simple electric on-off switching operation for securing and removing the cushion member. Accordingly, it is possible to positively retain a cushion member to a predetermined position in an upper die without any deformation created in the cushion member.

DETAILED DESCRIPTION OF A PREFERRED EMBODIMENT OF THE INVENTION

Figure 1:
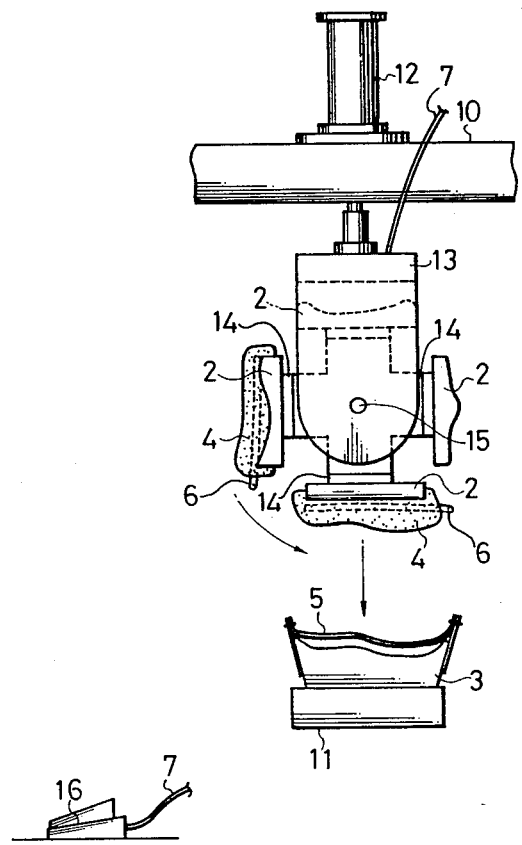
FIG. 1 is a front view of an apparatus according to the present invention.

Referring firstly to FIG. 1, the construction of the present invention will be described.

Reference numerals (10) and (11), respectively, denote an upper frame and a base. On the base (11), fixedly mounted is a lower die (3).

The lower die (3) is so adapted that a top cover member 95) is placed thereupon, and the outer surface of the lower die (3) is formed in a shape indentical to that of a cushion member (4). The cushion member (4) is foamed by a mold in the shape of outer configuration of a seat. A hydraulic or pneumatic elevating cylinder (12) is provided on the upper frame (10) such that the cylinder (12) is disposed right above the lower die (3).

A turret mounting member (13) is connected to a rod of the elevating cylinder (12) so that operating the cylinder (12) causes vertical movement of the turrent mounting member (13).

Figure 5:
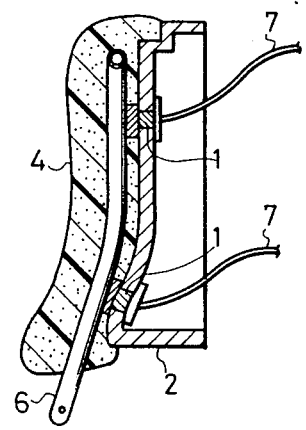
FIG. 5 is a sectional view showing the state in which the the cushion member is secured to and in close contact with the upper die.

Rotatably fixed to the turret mounting member (13), is a crossshaped shaped turret (14), which is rotated about a shaft (15) intermittently at 90 degrees by means of other cylinder (not shown) than the cylinder (12). Four upper dies (2) are fixed to the respective ends of the cross-shaped turret (14), each of the upper dies (2) being so adapted that the cushion member (4) is secured thereupon, and having a surface formed in the shape corresponding to the bottom surface configuration of the cushion member (4), as shown in FIG. 5. Thus, when the turret (14) is rotated in the direction of arrow, the lower die (2) with the cushion member (4) secured thereon is displaced downwardly, and then, by operating the elevating cylinder (12), the upper die (2) is caused to move down in a direction towards the lower die (3).

Figure 2:
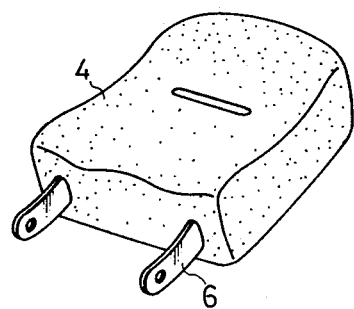
FIG. 2 is a perspective view of a cushion member with its front surface being positioned upwards.
Figure 3:
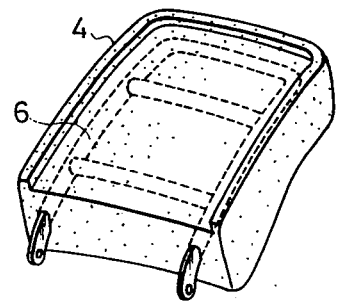
FIG. 3 is a perspective view of a cushion member with its rear surface being positioned upwards.

Now, with reference to FIGS. 2 and 3, the structure of the cushion member (4) will be described.

In these figures, the reference numeral (6) designates a metallic frame, which is formed by bending a metallic pipe into a substantially U-shaped configuration with a plurality of tubular members extended between the two parallel bar sections of the frame. The aforementioned cushion member (4) is foamed together with such metallic frame (6) into an integral one.

Figure 4:
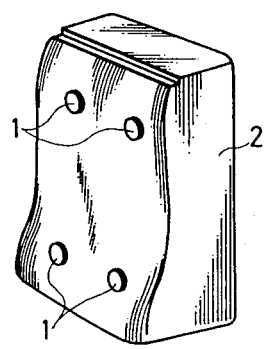
FIG. 4 is an elevation view of an upper die in accordance with the present invention.

As illustrated in FIGS. 4 and 5, a plurality of electromagnets (1) are arranged at appropriate regions in the abovementioned upper dies (2). Energizing the electromagnets (1) produces a magnetic force to attract the metallic frame (6), whereby the cushion member (4) is drawn to and retained by the upper die (2). The electromagnets (1) are electrically connected via cords (7) with a foot switch (16) as shown in FIG. 1. On-off switch operation of the foot switch (16) permits securing and removing the cushion member (4) to and out of the upper dies (2).

For the sake of precision, the electromagnets (1) may be arranged in each of the upper dies (2) such as to be disposed in conformity with the configuration of the metallic frame (6).

From the above described embodiment of the present invention, it will be understood that the magnetic securing of the cushion member (4) by virtue of the electromagnets (1) to the upper die (1) ensures a complete close contact between the cushion member (4) and upper die (1) with no clearance, and thus the cushion member (4) is exactly located at a predetermined position relative to the top cover member (5). It will also be seen that, after the top cover member (5) has been bonded to the cushion member (4), when the electromagnets (1) are deenergized by turning off the foot switch (16), the resultant cushion member (4) with the top cover member (5) can be taken out.

It should be noted here that after having bonded the top cover member (5) to the cushion member (4), the non-bonded portion of the top cover member (5) is turned reversely to cover the non-bonded portion of the cushion member (4), to thereby finish a seat.

The present invention with the above-discussed construction is endowed with the undermentioned meritorious effects. 1. A relatively heavy cushion member having a metallic frame embedded therein can be positively retained, and there is no need to equip a special mechanism for opening and closing clamps to secure the cushion member, thus greatly improving the operating procedure for securing the cushion member to the upper die, as well as simplifying the structure of apparatus. 2. No such pressing means as clamps are required for securing the cushion member, and consequently almost no deformation takes place in the cushion member, which makes it possible to precisely bond the cushion member to the top cover member. 3. The cushion member is prevented from dangling from the upper die. Accordingly, a precise position of the cushion member relative to the top cover member can be estabished and a high precision is attained in bonding together those two members. 4. The electromagnets in the upper die apply a magnetic force only to the metallic frame embedded at predetermined points in the cushion member, and not to the other portions of the cushion member where the metallic frame is not present. Therefore, the predetermined points of the cushion member is attracted to and contacted with the upper die in conformity with the arrangement of the electromagnets. This allows the cushion member to be exactly secured to a predetermined position in the upper die.

What is claimed is:

1. An apparatus for manufacturing a seat comprising a pair of upper and lower dies so arranged that the upper die is vertically movable relative to the lower die and that the upper die is adapted to mount a cushion member thereon while the lower die is adapted to mount a top cover member thereon, wherein said cushion member has a metallic frame embedded therein, and wherein said upper die includes at least one electromagnet arranged therein, so that said cushion member is brought into contact with and retained by said upper die, and when said upper die is lowered to and depressed against said lower die, said cushion member is bonded to said top cover member by means of an adhesive, and wherein further, said electromagnet arranged in said upper die comprises a plurality of electromagnets which are arranged in a surface of said upper die in a configuration corresponding to the configuration of said metallic frame in said cushion member.

2. The apparatus according to claim 1, wherein said upper die has a surface formed in a shape corresponding to that of the bottom surface configuration of said cushion member, and wherein said electromagnet is arranged on said surface of said upper die.

3. The apparatus according to claim 1, wherein said electromagnet embedded in said upper die comprises a plurality of electromagnets which are so arranged in a surface of said upper die that they are disposed in conformity with a configuration of said metallic frame in said cushion member.

4. The apparatus according to claim 1, wherein said upper die comprises four upper dies fixedly mounted on the respective ends of a cross-shaped turret, each of said dies having said plurality of electromagnets located therein, such that rotation of said turret causes downward displacement of one of said upper dies towards said lower dies, and then said cushion member is bonded to said top cover member and wherein, after completion of bonding between said cushion and top cover members, the electromagnets in said one of said upper dies are deenergized to have no magnetic force.

* * * * *